(12) United States Patent
Yamakado et al.

(10) Patent No.: US 11,276,092 B2
(45) Date of Patent: Mar. 15, 2022

(54) PROVIDING DEVICE, PROCESSING SYSTEM, AND COMMUNICATION METHOD

(71) Applicant: SEIKO EPSON CORPORATION, Tokyo (JP)

(72) Inventors: Hitoshi Yamakado, Tokyo (JP); Tsuyoshi Kameda, Tokyo (JP); Hiroyuki Kuramoto, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 135 days.

(21) Appl. No.: 16/550,358

(22) Filed: Aug. 26, 2019

(65) Prior Publication Data

US 2020/0074516 A1 Mar. 5, 2020

(30) Foreign Application Priority Data

Aug. 28, 2018 (JP) .............................. JP2018-158989

(51) Int. Cl.
*G06Q 30/04* (2012.01)
*G06Q 20/06* (2012.01)

(52) U.S. Cl.
CPC ........... *G06Q 30/04* (2013.01); *G06Q 20/065* (2013.01)

(58) Field of Classification Search
None
See application file for complete search history.

(56) References Cited

U.S. PATENT DOCUMENTS

| | | | | |
|---|---|---|---|---|
| 9,098,333 B1 * | 8/2015 | Obrecht | ............... | G06F 11/3442 |
| 9,262,470 B1 * | 2/2016 | Evans | .................... | G06F 16/738 |
| 9,449,042 B1 * | 9/2016 | Evans | ...................... | G06F 8/36 |
| 9,454,565 B1 * | 9/2016 | Evans | ..................... | G06F 16/24 |
| 9,652,617 B1 * | 5/2017 | Evans | ..................... | G06F 21/56 |
| 9,921,827 B1 * | 3/2018 | Evans | ........................ | G06F 8/71 |
| 10,269,029 B1 * | 4/2019 | Evans | .................... | G06Q 30/02 |
| 10,901,732 B1 * | 1/2021 | Nelson | .................... | G06F 9/223 |
| 2001/0056413 A1 * | 12/2001 | Suzuki | ................ | G06Q 20/145 |
| | | | | 705/418 |
| 2002/0073002 A1 | 6/2002 | Horii et al. | | |
| 2004/0012637 A1 * | 1/2004 | Alford, Jr. | .......... | G06F 11/3466 |
| | | | | 715/772 |

(Continued)

FOREIGN PATENT DOCUMENTS

JP 2002-036582 A 2/2002

OTHER PUBLICATIONS

N. M. Ahmad, S. F. Abdul Razak, S. Kannan, I. Yusof and A. H. Muhamad Amin, "Improving Identity Management of Cloud-Based IoT Applications Using Blockchain," 2018 International Conference on Intelligent and Advanced System (ICIAS), Kuala Lumpur, Malaysia, 2018, pp. 1-6, (Ahmad). (Year: 2018).*

(Continued)

*Primary Examiner* — Chikaodinaka Ojiaku
(74) *Attorney, Agent, or Firm* — Global IP Counselors, LLP

(57) ABSTRACT

A providing device includes: a communication unit communicating with a network using a blockchain; and a processing unit controlling the communication unit. The processing unit generates a transaction for registering, into the blockchain, a charging processing program for performing charging processing according to a status of use of an electronic apparatus that is a management target, and issues the generated transaction to the network via the communication unit.

12 Claims, 7 Drawing Sheets

(56) References Cited

U.S. PATENT DOCUMENTS

| | | | |
|---|---|---|---|
| 2006/0253404 A1 | 11/2006 | Horii et al. | |
| 2016/0266594 A1* | 9/2016 | Kauffman | G06Q 50/06 |
| 2016/0342978 A1* | 11/2016 | Davis | G06Q 20/40 |
| 2016/0373588 A1* | 12/2016 | Raleigh | H04M 15/61 |
| 2017/0236104 A1* | 8/2017 | Biton | H04L 9/30 |
| | | | 705/64 |
| 2017/0236196 A1* | 8/2017 | Isaacson | G06Q 30/0641 |
| | | | 705/14.51 |
| 2017/0243216 A1* | 8/2017 | Kohn | H04L 9/3236 |
| 2017/0256003 A1* | 9/2017 | Isaacson | G06Q 20/12 |
| 2017/0345105 A1* | 11/2017 | Isaacson | G06Q 30/0633 |
| 2018/0025442 A1* | 1/2018 | Isaacson | G06F 3/048 |
| | | | 705/26.62 |
| 2018/0040040 A1* | 2/2018 | Barski | G06Q 20/12 |
| 2018/0075453 A1* | 3/2018 | Durvasula | G06Q 20/389 |
| 2018/0165655 A1* | 6/2018 | Marcelle | G06Q 10/1095 |
| 2018/0196836 A1* | 7/2018 | Sundaram | G06F 16/2358 |
| 2018/0197155 A1* | 7/2018 | Georgen | G06Q 20/023 |
| 2018/0197156 A1* | 7/2018 | Beesley | H04L 12/1485 |
| 2018/0197173 A1* | 7/2018 | Durvasula | G06Q 20/209 |
| 2018/0198876 A1* | 7/2018 | Ma | H04L 67/22 |
| 2018/0218356 A1* | 8/2018 | Grassadonia | G06Q 20/10 |
| 2018/0232693 A1* | 8/2018 | Gillen | G06Q 10/0833 |
| 2018/0268617 A1* | 9/2018 | Bruce | G08G 1/142 |
| 2018/0285549 A1* | 10/2018 | Sonkar | G06Q 20/40145 |
| 2018/0287893 A1* | 10/2018 | O'Brien | H04M 15/66 |
| 2018/0331832 A1* | 11/2018 | Pulsifer | H04L 9/0637 |
| 2018/0343307 A1* | 11/2018 | Lotter | H04M 1/72463 |
| 2019/0108542 A1* | 4/2019 | Durvasula | G06Q 20/065 |
| 2019/0158470 A1* | 5/2019 | Wright | G06Q 20/065 |
| 2019/0164140 A1* | 5/2019 | Pasupula | G06Q 20/065 |
| 2019/0165967 A1* | 5/2019 | Wallace | G06Q 10/087 |
| 2019/0229890 A1* | 7/2019 | Brehmer | H04L 9/3242 |
| 2019/0303931 A1* | 10/2019 | Valencia | G06Q 20/3278 |
| 2019/0340575 A1* | 11/2019 | Kankaria | G06F 21/30 |
| 2019/0363892 A1* | 11/2019 | Wang | H04L 9/3297 |
| 2019/0364426 A1* | 11/2019 | Muthukrishnan | B60R 13/10 |
| 2019/0372345 A1* | 12/2019 | Bain | G06Q 30/0601 |
| 2019/0373339 A1* | 12/2019 | Bradley | G06F 16/1805 |
| 2020/0014720 A1* | 1/2020 | Giura | H04L 63/20 |
| 2020/0092102 A1* | 3/2020 | Wang | H04W 12/06 |
| 2020/0134139 A1* | 4/2020 | Vaish | G06F 21/335 |

OTHER PUBLICATIONS

V. Agarwal, N. Karnik and A. Kumar, "An information model for metering and accounting," 2004 IEEE/IFIP Network Operations and Management Symposium (IEEE Cat. No. 04CH37507), 2004, pp. 541-554 vol. 1(Metering) (Year: 2004).*

Zielinska, Anna & Skowron, Mikołaj & Bien, Andrzej. (2019). The concept of the blockchain technology model use to settle the charging process of an electric vehicle. 271-274. 10.23919/PTZE.2019.8781739. (Year: 2019).*

* cited by examiner

PROVIDING DEVICE, PROCESSING SYSTEM, AND COMMUNICATION METHOD

The present application is based on, and claims priority from JP Application Serial Number 2018-158989, filed Aug. 28, 2018, the disclosure of which is hereby incorporated by reference herein in its entirety.

BACKGROUND

1. Technical Field

The present disclosure relates to a providing device, a processing system, and a communication method or the like.

2. Related Art

According to the related art, a management tool for collecting information of an electronic apparatus such as a printer is known. Also, a system for charging processing according to the status of use of a consumable part of an electronic apparatus is known. For example, JP-A-2002-36582 discloses a charging device which detects the amount of remaining ink in a printer and refunds according to the amount of remaining ink, thus charging an amount according to the amount of ink used.

Various system configurations for performing charging processing according to the status of use of an electronic apparatus are conceivable. For example, a technique of linking a plurality of systems to work in cooperation with each other, such as a system for collecting and aggregating data from an electronic apparatus, a system for calculation for charging based on the result of aggregation, a system for invoicing for the amount charged, and a system for settlement, is conceivable.

However, according to the related art, a technique using a blockchain technology in a system for charging processing according to the status of use of an electronic apparatus is not disclosed.

SUMMARY

A providing device according to an aspect of the present disclosure includes: a communication unit communicating with a network using a blockchain; and a processing unit controlling the communication unit. The processing unit generates a transaction for registering, into the blockchain, a charging processing program for performing charging processing according to a status of use of an electronic apparatus that is a management target, and issues the generated transaction to the network via the communication unit.

DESCRIPTION OF EXEMPLARY EMBODIMENTS

Hereinafter, an embodiment will be described. The embodiment described below should not unduly limit the content of the present disclosure described in the appended claims. Not all the components described in the embodiment are necessarily essential components.

1. Outline

Figure 1:
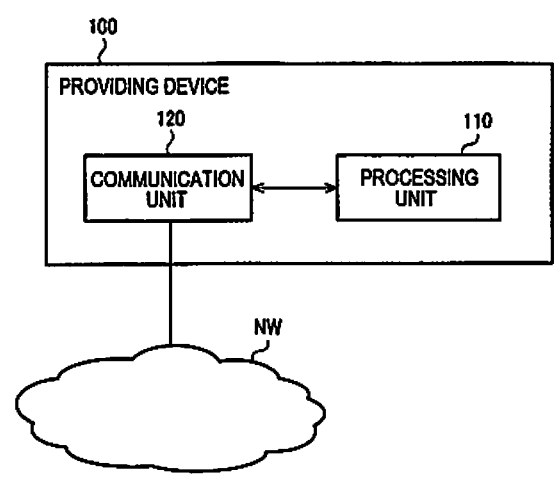
FIG. 1 shows a configuration example of a providing device.

FIG. 1 shows a configuration example of a providing device 100 in this embodiment. The providing device 100 includes a communication unit 120 communicating with a network using a blockchain, and a processing unit 110 controlling the communication unit 120. The processing unit 110 generates a transaction for registering, into the blockchain, a charging processing program for performing charging processing according to the status of use of an electronic apparatus 300 that is a management target, and issues the generated transaction to the network via the communication unit 120. As described in detail later with reference to FIG. 2, the electronic apparatus 300 is coupled to the network using the blockchain, directly or via a processing device 200. The network using the blockchain is hereinafter referred to as a blockchain network NW. The phrase "register into the blockchain" specifically means that data is written into a block in the blockchain.

In the blockchain network NW, a data structure called a blockchain in which a plurality of blocks is linked together in the form of a chain is used. A transaction is a command issued when performing processing to register data into the blockchain. Each node in the blockchain network NW holds a blockchain of the same content. Therefore, when a transaction including a processing program issued by the providing device 100 is written into the blockchain, the processing program can be referred to from all the nodes participating in the blockchain network NW. The processing program in this case is, in a narrow sense, a charging processing program. However, the processing program may include various other programs related to charging, as described later. This facilitates the provision of each processing program to implement the charging processing.

The electronic apparatus 300 in the embodiment is, for example, a printer. Alternatively, the electronic apparatus 300 may be a scanner, facsimile machine or copy machine. The electronic apparatus 300 may also be a multifunction peripheral (MFP) having a plurality of functions. An MFP having a print function is an example of the printer. The electronic apparatus 300 may also be a projector, head-mounted display device, wearable device, biological information measuring device such as pulse meter or activity meter, robot, video device such as camera, portable information terminal such as smartphone, or physical quantity measuring device or the like.

The processing unit 110 in the embodiment is formed of the following hardware. The hardware can include at least one of a circuit processing a digital signal and a circuit processing an analog signal. For example, the hardware can be formed of one or a plurality of circuit devices or one or a plurality of circuit elements, installed at a circuit board. The one or plurality of circuit devices is, for example, IC(s).

The one or plurality of circuit elements is, for example, resistor(s), capacitor(s) or the like.

The processing unit 110 may also be implemented by the following processor. The providing device 100 in the embodiment includes a memory storing information, and a processor operating based on the information stored in the memory. The information is, for example, a program and various data or the like. The processor includes hardware. As the processor, various processors can be used, such as CPU (central processing unit), GPU (graphics processing unit), or DSP (digital signal processor). The memory may be a semiconductor memory such as SRAM (static random-access memory) or DRAM (dynamic random-access memory), register, magnetic storage device such as hard disk device, or optical storage device such as optical disk device. For example, the memory stores a computer-readable command. As the processor executes the command, the function of each part of the providing device 100 is implemented as processing. The command in this case may be a command in a command set forming a program, or a command instructing the hardware circuit of the processor to perform an operation.

Figure 2:
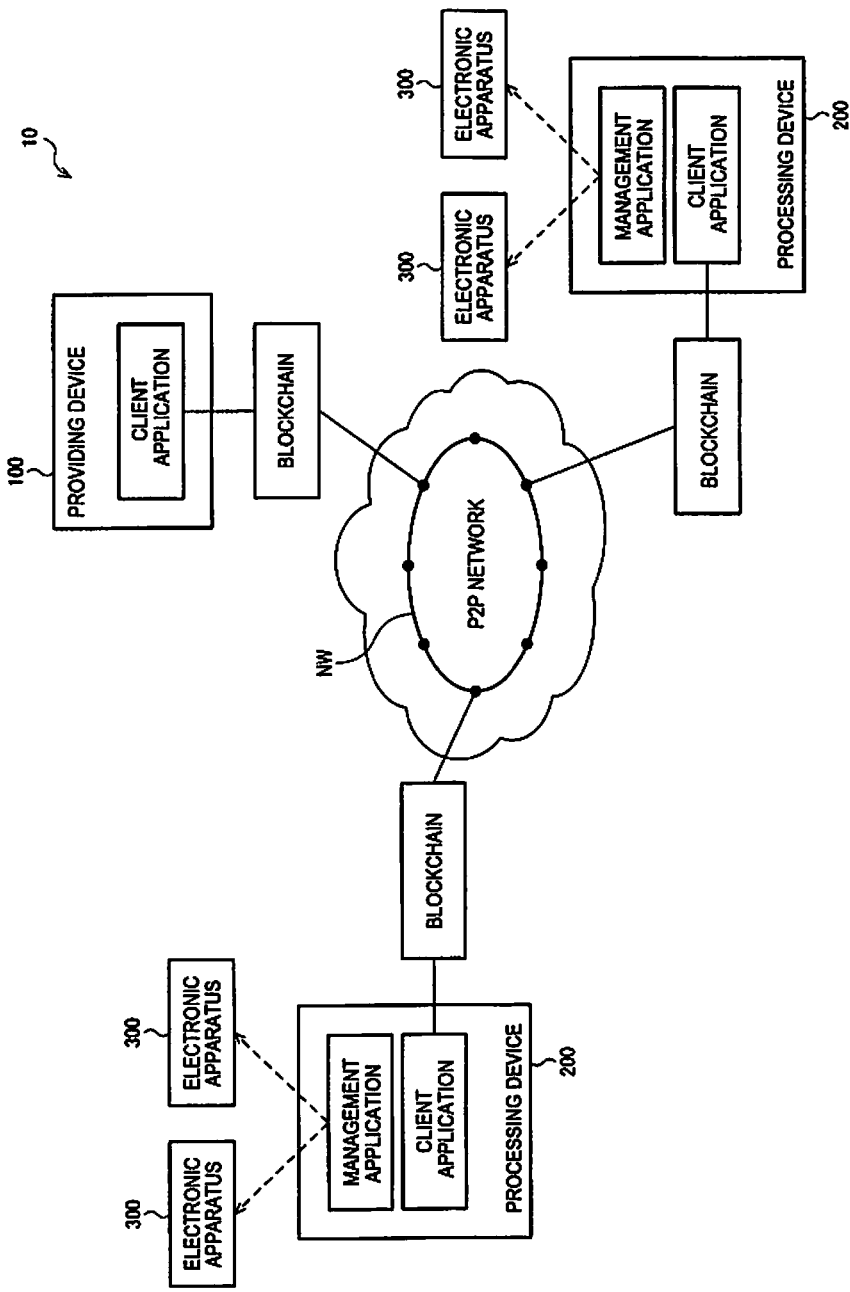
FIG. 2 shows a configuration example of a processing system.

FIG. 2 shows a configuration example of a processing system 10 including the providing device 100 in the embodiment, and the processing device 200. The processing device 200 is a device which is provided corresponding to the electronic apparatus 300 and which executes a processing program. FIG. 2 shows an example where two processing devices 200 are provided and where two electronic apparatuses 300 are coupled to each processing device 200. However, the number of processing devices 200 and the number of electronic apparatuses 300 are not limited to this example. Also, while FIG. 2 shows an example where the processing device 200 and the electronic apparatus 300 are different apparatuses, the electronic apparatus 300 may include the processing device 200. That is, the electronic apparatus 300 may directly participate in the blockchain network NW.

In the providing device 100 and the processing device 200, a client application of a blockchain is installed. The client application is software for participating in the blockchain network NW. The client application is software for executing various kinds of processing performed in the blockchain network NW, such as generation and issue of a transaction, processing of a consensus algorithm, and management of a cryptocurrency.

Also, a management application for managing the electronic apparatus 300 is installed in the processing device 200. The client application and the management application may be different applications that can cooperate with each other, or may be implemented as one application including both the blockchain client function and the management function for the electronic apparatus 300.

The management application executes a processing command to the electronic apparatus 300 and thus controls the electronic apparatus 300. Various processing commands for controlling the electronic apparatus 300 are conceivable, such as an initialization command, a restart command, and a setting change command. A collection program for acquiring status-of-use data of the electronic apparatus 300 is assumed to be written into the blockchain and executed by the client application. However, the management application may hold a processing program equivalent to the collection program. In this case, the management application periodically executes this processing program. Thus, the status-of-use data of the electronic apparatus 300 is acquired.

The technique in the embodiment may be applied not only to the providing device 100 shown in FIG. 1 but also to the processing system 10 shown in FIG. 2. As shown in FIG. 2, the processing system 10 according to the embodiment includes the providing device 100, and the processing device 200 which is provided corresponding to the electronic apparatus 300.

2. Blockchain and Smart Contract

The blockchain technology will now be described. The following description is a part of elements forming the blockchain technology. A different technical element may be added. Also, a part of the technical elements described below may be omitted. The blockchain technology in the embodiment also includes an extended form of each technical element.

Blockchain is a technique for distributed consensus building by participants in an open network. The blockchain network NW is a P2P network. Therefore, unlike a client/server system, no particular apparatus performs centralized management of data. In the blockchain network NW, data is managed based on a data structure called blockchain, where blocks are coupled together, and each node holds a common blockchain.

Figure 3:
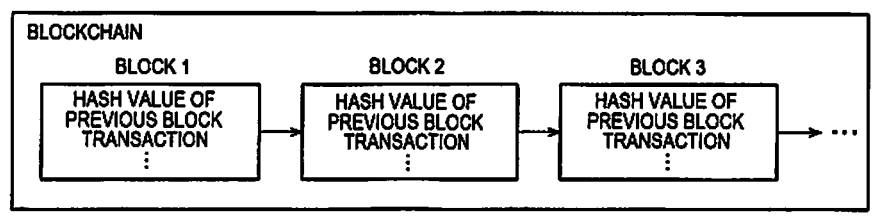
FIG. 3 is an explanatory view of a blockchain.

FIG. 3 explains the structure of a blockchain. One block includes data of a plurality of transactions, and data of the hash value of a previous block. The hash value of a previous block is specifically the hash value of the block header of the immediately previous block. Based on the hash value, a link between blocks is achieved. A transaction is a command issued by a node when registering data into the blockchain. For example, when doing business in a cryptocurrency, a transaction including information of the user address of the remitter, the user address of the remittee, and the amount remitted, or the like, is generated.

The generated transaction is broadcast with a signature of the sender and is propagated to each node in the blockchain network NW. The transmission of a transaction can be implemented by various data propagation algorithms used in the P2P network. For example, a method of simply transmitting a transaction to a neighboring node and repeating propagation from the neighboring node to another node may be employed. Alternatively, a particular node that is highly probable to exist, called a supernode, may be prescribed, and a transaction may be transmitted to the supernode. Defining the supernode as the destination can increase the probability that the transaction propagates to each node in the blockchain network NW.

Addition of a block to the blockchain is executed by a node called a miner. When a predetermined amount of transaction is accumulated, the miner attempts to generate a block including the transaction. The block is added to the blockchain under the condition that a consensus is built based on a consensus algorithm.

When PoW (Proof of Work) is used as the consensus algorithm, the hash value of the block header needs to satisfy a particular condition. The particular condition is, for example, the hash value is lower than a predetermined threshold. The block header includes a field called a nonce. The nonce is set by the miner. In other words, the miner executes processing to search for a nonce such that the hash value of the block header satisfies the particular condition. With a hash function for finding the hash value, it is difficult to predict an output value from an input value. Therefore, the miner needs to search for a nonce that satisfies the condition, by changing the nonce like a round-robin event. That is, PoW is a method of building a consensus based on the amount of work.

When a new block is generated by the miner, the block is verified at each node and then propagates in the blockchain network NW. The verification at each node is the processing to find a hash value and determine whether the hash value satisfies the particular condition or not. This processing can be executed within a short time.

The consensus algorithm is not limited to PoW. Other consensus algorithms may be used, such as PoS (Proof of Stake), which gives the right to speak according to the amount of cryptocurrency held, or PoI (Proof of Importance), which gives the right to speak according to the degree of importance of the participant. Also, when a specific signature is given, it may be unconditionally regarded that a consensus is built. When a private network which only a limited user and terminal can access is used, it may be unconditionally regarded that a consensus is built, without even the determination about signature. The consensus building based on the consensus algorithm in the embodiment includes the case where it is unconditionally regarded that a consensus is built.

Figure 4:
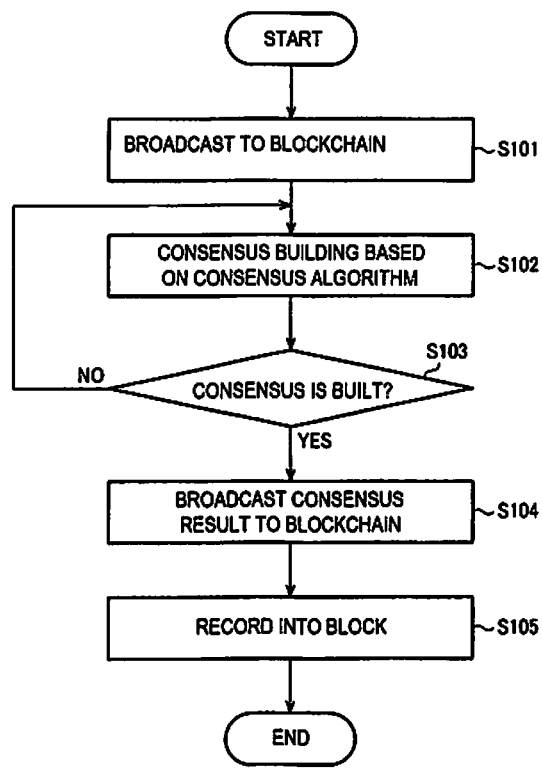
FIG. 4 is a flowchart explaining write processing to a blockchain.

FIG. 4 is a flowchart explaining processing to write data into the blockchain. As this processing starts, first, a node that wishes to write data into the blockchain generates a transaction including the data and broadcasts the transaction in the blockchain network NW (S101). The notification to each node is not limited to broadcasting and may use other measures used in the P2P network, as described above.

Next, each node receiving the data carries out consensus building based on a consensus algorithm in order to determine whether the data can be written into the blockchain or not (S102). As the consensus algorithm, various algorithms such as PoW, PoS, and PoI can be employed, as described above. The processing of step S102 is repeated until a consensus is built based on the consensus algorithm (when No in step S103).

When a consensus is built based on the consensus algorithm (Yes in step S103), the consensus building is broadcast to each node (S104) and each node writes the data into the blockchain held by the node itself (S105). By this processing, the data broadcast in step S101 is added to the blockchain and becomes available to each node.

In the blockchain network NW, a program executed at a node can be added to the blockchain. The program includes a state and a function and is executed based on the execution environment within the node. The state may be rephrased as a set of variables. The function may be rephrased as subroutine, method or the like. The execution environment in the node is, for example, a virtual machine. Such a mechanism of adding a program to the blockchain and executing the program at a node is called a smart contract.

The writing of a program into the blockchain, based on a smart contract, is similarly executed according to the flow described with reference to FIG. 4. That is, a node that wishes to write based on a smart contract generates and broadcasts a transaction including a program that is a writing target. When a consensus is built on the transaction based on the consensus algorithm, the program is written into the blockchain, based on the smart contract.

The processing unit 110 of the providing device 100 according to the embodiment generates a transaction for registering a charging processing program as a smart contract into the blockchain. Writing a charging processing program into the blockchain using a smart contract in this way enables execution of the charging processing program at an arbitrary node in the blockchain network NW.

Particularly, in the blockchain technology, another smart contract program can be accessed from a predetermined smart contract program. That is, as the charging processing program or the like written into the blockchain is executed based on a smart contract, a cooperation between processing programs can be easily achieved. A specific example of the cooperation will be described later.

3. Details of Processing

The processing in the embodiment will now be described. First, a specific example of the smart contract used in the processing in the embodiment will be described. Then, a flow of the processing will be described using a flowchart.

3.1 Details of Smart Contract 3.1.1 Contract Management Contract

The processing unit 110 of the providing device 100 generates a transaction for registering, into the blockchain, a contract management program for managing contract account information to decide a charging content. The contract management program written as a smart contract into the blockchain is referred to as a contract management contract. Thus, processing to decide the charging content based on the contract content can be executed, based on a program shared using the blockchain.

The contract account information includes contract ID, contracting party information, contract content information, information of the electronic apparatus 300 that is a management target, collection rule of status-of-use data of the electronic apparatus 300, and the like.

The contract ID is information univocally specifying the contract. The contracting party information is information of the name and ID of a client who is a contracting party. A predetermined contracting party may conclude a plurality of charging contracts.

The contract content information is information including contract type, unit price, discount information, cut-off date, invoicing method, and the like. The contract type expresses which data of the status-of-use data is used for charging, for example, charging according to the number of sheets printed, charging according to the amount of ink consumed, charging according to the time of use, or the like. The contract type may include information representing the presence/absence of a fixed fee portion. The unit price is information of the amount charged per unit quantity, for example, information about how much yen per sheet of a predetermined sheet size, or information about how many milliliters of ink consumed for how much yen. The discount information is information of the discount rate, for example, a discount at what percent off the amount charged when a predetermined number of sheets or more or a predetermined amount of ink or more is used.

The contract management contract is periodically executed and executes another program written into the blockchain, based on the smart contract, according to a condition designated in advance. The contract management contract itself may have a periodic execution function. Alternatively, the contract management contract may be periodically started from outside and may start another program written into the blockchain, when there is a task that needs to be done.

3.1.2 Collection Contract

The processing unit 110 of the providing device 100 generates a transaction for registering, into the blockchain, a collection program for collecting the status-of-use data of the electronic apparatus 300. The collection program is a program started according to a predetermined schedule by the contract management program. The collection program written as a smart contract into the blockchain is referred to as as a collection contract. Thus, the collection of the status-of-use data of the electronic apparatus 300 can be executed, based on a program shared using the blockchain.

The acquisition of the status-of-use data based on the collection contract is executed, for example, in conformity with SNMP (Simple Network Management Protocol). In this case, the processing device 200 executing the collection contract is a manager of communication, and each electronic apparatus 300 is an agent of communication. The processing device executes the collection program, thus carries out communication in conformity with SNMP, and receives MIB (Management Information Base) information from the electronic apparatus.

The status-of-use data in the embodiment is amount-of-use information or time-of-use information of the electronic apparatus 300. The amount-of-use information is information representing the degree of use of the electronic apparatus 300 as a quantity, and in a narrow sense, the amount of consumption of a consumable part. When the electronic apparatus 300 is a printer, the number of sheets printed or the amount of ink consumed is employed. However, the amount-of-use information is not limited to the amount of a consumable part. For example, when the electronic apparatus 300 is a scanner, the number of documents read may be employed as the amount-of-use information. Alternatively, the amount of movement of a moving part of the electronic apparatus 300, for example, the amount of rotation of a motor or the like may be employed as the amount-of-use information. The time-of-use information is information representing the time for which the electronic apparatus 300 is used. The time-of-use information is, for example, information representing the time for which the power of the electronic apparatus 300 is on. However, the time for which a particular function of the electronic apparatus 300 is used may be employed as the time-of-use information. As the particular function, various functions are conceivable, such as the print function of a printer, and the scanning function of a scanner. Thus, status-of-use data suitable for charging processing can be acquired.

The collection contract also performs processing to register the acquired status-of-use data into the blockchain. Specifically, the collection contract performs issue processing for generating a transaction including the status-of-use data and registering the transaction into the blockchain. When a consensus is built based on a consensus algorithm, a block including the transaction is added to the blockchain, and this enables the status-of-use data to be referred to from each node.

As described above, the contract management contract holds the information about the collection rule for status-of-use data. As the contract management contract starts the collection contract, the status-of-use data can be collected at a proper timing according to the contract account information. More specifically, the contract management contract designates an electronic apparatus 300 to be a collection target and starts the collection contract, and the collection contract acquires the status-of-use data of the designated electronic apparatus 300. Although the specific start timing can be implemented with various modifications, it is desirable that the collection contract is started at least once a day.

3.1.3 Aggregation Contract

The processing unit 110 of the providing device 100 generates a transaction for registering, into the blockchain, an aggregation program for aggregating the status-of-use data of the electronic apparatus 300. The aggregation program is a program started by the contract management program. The aggregation program written as a smart contract into the blockchain is referred to as an aggregation contract. Thus, aggregation processing of the status-of-use data collected by the collection contract can be executed, based on a program shared using the blockchain.

As described above, the contract management contract holds the information about the cut-off date. The cut-off date is information representing a date that serves as a reference point in the charging processing, for example, information of the last day of every month or the like. However, the setting of the cut-off date is not limited to once a month and may be on a different cycle such as once every two months. As the contract management contract starts the aggregation contract, the aggregation processing for charging can be executed at a proper timing.

More specifically, the contract management contract designates a contract ID, an aggregation target period, and an electronic apparatus 300 to be an aggregation target, and starts the aggregation contract. Hereinafter, the electronic apparatus 300 to be an aggregation target is referred to as an aggregation target apparatus. The aggregation contract acquires data of the aggregation target period and about the aggregation target apparatus, of the status-of-use data saved in the blockchain, and performs aggregation processing of the acquired data. The aggregation processing is, in a narrow sense, arithmetic processing to calculate a total value of the amount of use or the time of use over the entire aggregation target period.

3.1.4 Charging Contract

As described above, the processing unit 110 of the providing device 100 generates a transaction for registering the charging processing program into the blockchain. The charging processing program is a program started by the aggregation program. The charging processing program written as a smart contract into the blockchain is referred to as a charging contract. Thus, the charging processing is started, triggered by the completion of the aggregation processing, and therefore the charging processing based on a proper aggregation result can be executed.

When the aggregation result is acquired, the aggregation contract starts the charging contract, using the contract ID and the aggregation result as parameters. The aggregation contract may write the aggregation result into the blockchain, and the charging contract may acquire the aggregation result from the blockchain. However, since aggregation and charging normally correspond one-to-one, the aggregation result can be transferred from the aggregation contract to the charging contract without using the blockchain.

The charging contract makes an inquiry to the contract management contract, based on the acquired contract ID, and acquires a contract condition corresponding to the contract ID. The contract condition corresponds to the unit price and the discount information, of the contract content information. The charging contract decides the amount charged, based on the aggregation result and the contract condition. For example, the charging contract multiplies the number of sheets printed, which is the aggregation result, by the unit price, then makes a discount off the multiplication result, based on the discount information, and decides the resulting amount as the amount charged.

3.1.5 Invoicing Contract

The processing unit 110 of the providing device 100 generates a transaction for registering, into the blockchain, an invoicing program for invoicing the corresponding contract account for the amount charged decided by the charging processing program. The invoicing program is a program started by the charging processing program. The invoicing program written as a smart contract into the blockchain is referred to as an invoicing contract. Thus, the invoicing of the amount charged decided by the charging contract can be executed, based on a program shared using the blockchain.

The charging contract starts the invoicing contract, using the contract ID and the amount charged as parameters. The invoicing contract makes an inquiry to the contract management contract, based on the acquired contract ID, and acquires an invoicing method corresponding to the contract ID. The invoicing method includes the destination of an invoice and the sending method for the invoice. The sending method is by mail or by email or the like. The invoicing contract sends the invoice according to the acquired invoicing method. When making a settlement using a cryptocurrency, the sending of the invoice is a payment request in the blockchain.

3.1.6 Settlement Contract

The processing device 200 generates a transaction for registering, into the blockchain, a settlement program for making a settlement in response to the invoicing based on the invoicing program. The settlement program is a program for making a settlement using a cryptocurrency in the blockchain. The settlement program is a program started by the invoicing program. The settlement program written as a smart contract into the blockchain is referred to as a settlement contract. Thus, the settlement in response to the invoicing based on the invoicing contract can be executed, based on a program shared using the blockchain.

The settlement contract is a contract for payment in a cryptocurrency and therefore needs to be registered into the blockchain by each contracting party for each contracting party. Therefore, the processing device 200 performs processing to generate a settlement contract and register the settlement contract into the blockchain. In the blockchain technology, it is allowable to write a program that generates a program into the blockchain, based on a smart contract. For example, the providing device 100 may provide a program for generating a settlement contract, based on a smart contract, and the processing device 200 may execute this program and thus generate a settlement contract for its own settlement. The settlement contract is, for example, a program holding the address of the contracting party as the remitter of the cryptocurrency.

The invoicing contract starts the settlement contract, using an invoice as a parameter. The invoice is information designating the address of the remitter and the amount remitted. The settlement contract performs processing to pay the invoice amount in the cryptocurrency from the address held of the contracting party to the address of the cryptocurrency designated in the invoice.

3.2 Specific Example of Blockchain

As described above, the providing device 100 in the embodiment performs the processing to write a processing program related to charging as a smart contract into the blockchain. Specifically, the processing unit 110 of the providing device 100 performs the processing to generate a transaction for registering each processing program into a block in the blockchain. The generated transaction is broadcast in the blockchain network NW. The processing device 200 performs the processing to write a settlement program as a smart contract into the blockchain. The processing device 200 similarly performs the processing to generate a transaction for registering the settlement contract into a block in the blockchain.

The flow following the generation of the transaction is as described above with reference to FIG. 4. Specifically, processing using a consensus algorithm is performed, and the block in which the transaction is placed is added to the blockchain when a consensus is build.

Figure 5:
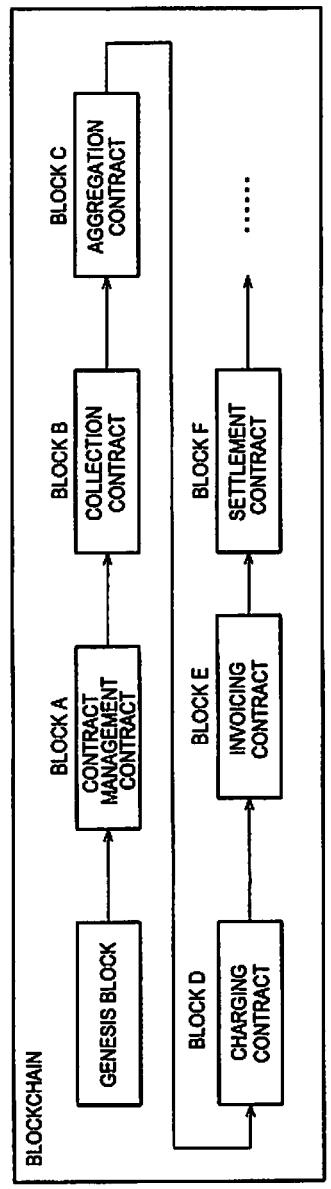
FIG. 5 shows an example of a blockchain in an embodiment.

FIG. 5 shows an example of the blockchain in the embodiment. A transaction including a contract management contract is written in a block A. A transaction including a collection contract is written in a block B. A transaction including an aggregation contract is written in a block C. A transaction including a charging contract is written in a block D. A transaction including an invoicing contract is written in a block E. A transaction including a settlement contract is written in a block F. Adding the blocks A to F to the blockchain enables each node in the blockchain network NW to execute each processing related to charging in the embodiment. FIG. 5 shows an example of the structure of the blockchain. Each program can be written into the blockchain based on a smart contract in whatever order. Also, a plurality of contracts may be written in one block.

The blockchain can include not only the programs written based on the smart contract shown in FIG. 5 but also arbitrary data communicated via the blockchain network NW. The data written into the blockchain may be, for example, data representing the result of execution of a program, information representing a cryptocurrency transaction, or other data. The data representing the result of execution may be status-of-use data, which is the result of execution of the collection contract, aggregation data, which is the result of execution of the aggregation contract, amount charged data, which is the result of execution of the charging contract, or the result of execution of a program not illustrated in FIG. 5. The information representing a cryptocurrency transaction may be the result of execution of the settlement contract or information representing the result of a different cryptocurrency transaction from the settlement contract according to the embodiment.

3.3 Details of Processing

Next, details of the processing in the embodiment will be described. The following description is based on the assumption that each of the foregoing programs is written in the blockchain, based on a smart contract, by the processing shown in FIG. 4.

When a contract about charging is concluded between a service provider and a contracting party using a service, registration processing to register contract account information into the blockchain is first performed as preprocessing. The contract in this case is, for example, a contract for print charge. The contract decides the information of the contract type, unit price, discount information, cut-off date, and invoicing method included in the contract management contract. Each piece of information is as described above.

The processing unit 110 of the providing device 100 writes, into the blockchain, the above information decided by the contract, and contract account information including contracting party information, information of the electronic apparatus 300 to be managed, a collection rule for the status-of-use data of the electronic apparatus 300, and the like. For example, the contract management contract includes a variable for managing the contract account information on a contracting party basis, and a function to update the variable. The processing unit 110 performs processing to issue a transaction for calling the function, using the contract account information of the contracting party as a parameter, and thus write the contract account information into the blockchain.

The charging processing in the embodiment is implemented by periodically executing two kinds of processing, that is, collection processing based on the collection contract and cut-off date processing to perform aggregation to settlement. The two kinds of processing are periodically executed by the contract management contract.

Figure 6:
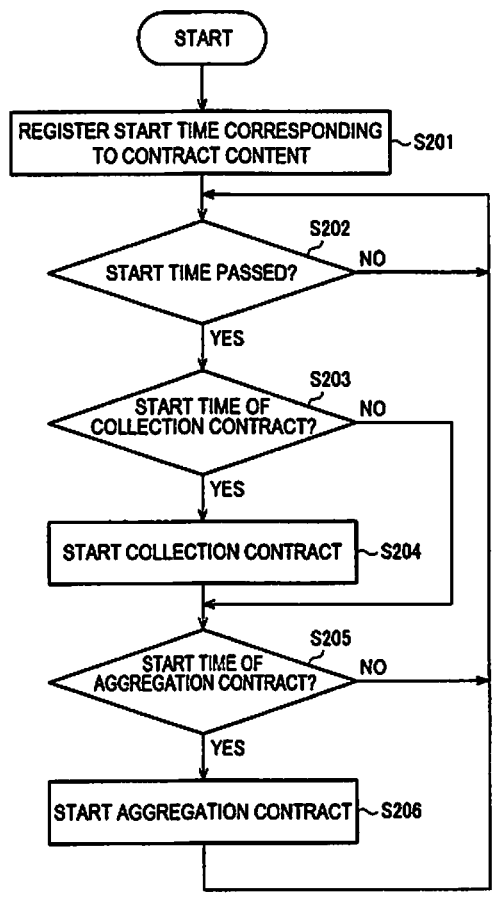
FIG. 6 is a flowchart explaining processing of a contract management contract.

FIG. 6 is a flowchart explaining the execution of the contract management contract. In the description below, it is assumed that the contract management contract executes each step in FIG. 6. However, in practice, one of the nodes in the blockchain network NW executes a program provided as a smart contract in the execution environment within the node, thus implementing each step. The registration of the contract management contract into the blockchain and the writing of the contract account information are considered to be executed by the providing device 100. However, each step described below with reference to FIG. 6 may be executed by the providing device 100 or by another node such as the processing device 200.

First, the contract management contract registers the start time of the collection contract or the aggregation contract, based on the contract account information (S201). The processing of step S201 is processing to acquire the information of the collection rule for status-of-use data and the cut-off date, referring to the contract account information of each contracting party included in the contract management contract. The collection rule is, for example, information such as "collect at 09:00 every day" or "collect four times at 09:00, 12:00, 15:00, and 18:00 every day". The cut-off date is, for example, information such as "09:00 on 21 of every month" or "08:00 on the first day of every month".

Next, the contract management contract compares the time acquired in step S201 with the current time and determines whether the start time has passed or not (S202). When the start time has not passed (No in step S202), the contract management contract returns to step S202 and continues the processing until the start time passes.

When it is determined that the start time has passed (Yes in step S202), the contract management contract determines whether it is the start time of the collection contract or not (S203). When Yes in step S203, the contract management contract starts the collection contract, using information specifying the electronic apparatus 300 that is a target of collection of status-of-use data, as a parameter (S204). When No in step S203, the collection contract is not started.

The contract management contract also determines whether it is the start time of the aggregation contract or not (S205). When Yes in step S205, the contract management contract starts the aggregation contract, using information specifying a contract ID, an aggregation target period, and an aggregation target apparatus, as a parameter (S206). When No in step S205, the aggregation contract is not started. When No in step S205, or after the processing of step S206, the contract management contract returns to step S202 and repeatedly executes the processing.

Performing the processing in FIG. 6 enables the start of the collection contract according to the collection rule or the start of the aggregation contract on the cut-off date. The contract management contract may have a periodic execution function. That is, the contract management contract may periodically execute the processing shown in FIG. 6, using its own function.

Alternatively, the contract management contract may not have the periodic execution function, and an external program may periodically start the contract management contract. In this case, the external program does not know the collection rule for status-of-use data and the cut-off date information. Therefore, the external program periodically starts the contract management contract at arbitrary intervals such as every minute, every five minutes, every 30 minutes, or every hour. Every time the contract management contract is started, the contract management contract performs the processing shown in FIG. 6. That is, the contract management contract checks the collection rule for status-of-use data and the cut-off date, and starts the target collection contract or aggregation contract when there is a rule that is unexecuted and that has passed the scheduled time. For example, it is assumed that information "collect at 09:00 every day, collect at 09:00 every Monday" is acquired as the collection rule, that information "09:00 on 21 of every month (company A), 08:00 on the first day of every month (company B)" is acquired as the cut-off date, and that the contract management contract is started from the external program at 09:03 on 21 of a certain month. In this case, the contract management contract executes two kinds of processing, that is, starting the collection contract according to the collection rule "collect at 09:00 every day", and starting the aggregation contract according to the cut-off date "09:00 on 21 of every month (company A)".

Figure 7:
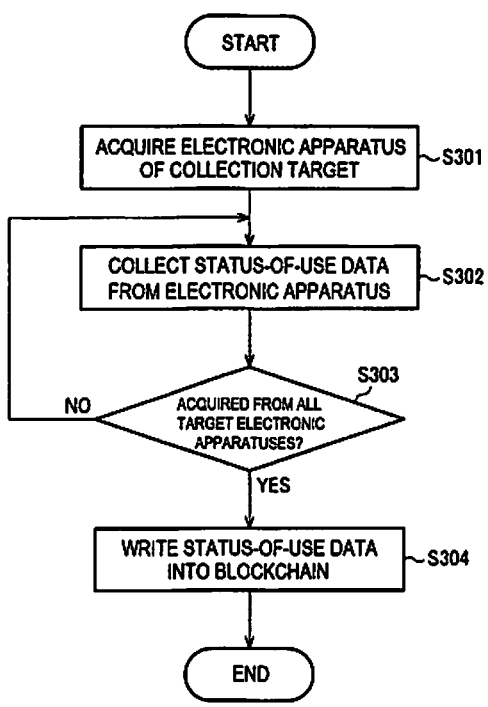
FIG. 7 is a flowchart explaining collection processing to collect status-of-use data.

FIG. 7 is a flowchart explaining the processing of the collection contract started in step S204. Each step shown in FIG. 7 is implemented by the collection contract operating in the execution environment of the processing device 200 coupled to the electronic apparatus 300 that is a collection target. As this processing is started, the collection contract acquires information of the electronic apparatus 300 that is a target of collecting status-of-use data, based on the information provided as a parameter from the contract management contract (S301).

Next, the collection contract collects status-of-use data from the electronic apparatus 300 that is a collection target, based on the information acquired in step S301 (S302). In step S302, the collection contract may collect only the data used for charging for the number of sheets printed or the amount of remaining ink or the like, or may collect other collectable data. For example, when the electronic apparatus 300 is a printer, the processing of step S302 is performed by communication in conformity with the foregoing SNMP. However, various modifications can be made to the technique for implementing step S302.

Next, the collection contract determines whether the collection from all the electronic apparatuses 300 that are collection targets is done or not (S303). When a target apparatus from which the status-of-use data is not collected yet is left (No in step S303), the collection contract returns to step S302 and continues collecting the status-of-use data. When the status-of-use data of all the electronic apparatuses 300 is collected (Yes in step S303), the collection contract performs processing to generate and issue a transaction for writing the collected status-of-use data into the blockchain (S304). The collection contract performs processing to write, into the blockchain, information specifying the electronic apparatus 300 that is a collection target, and collection time information, in association with the status-of-use data. The processing shown in FIG. 7 is performed once to several times a day. Thus, the status-of-use data of the electronic apparatus 300 is accumulated in the blockchain.

Figure 8:
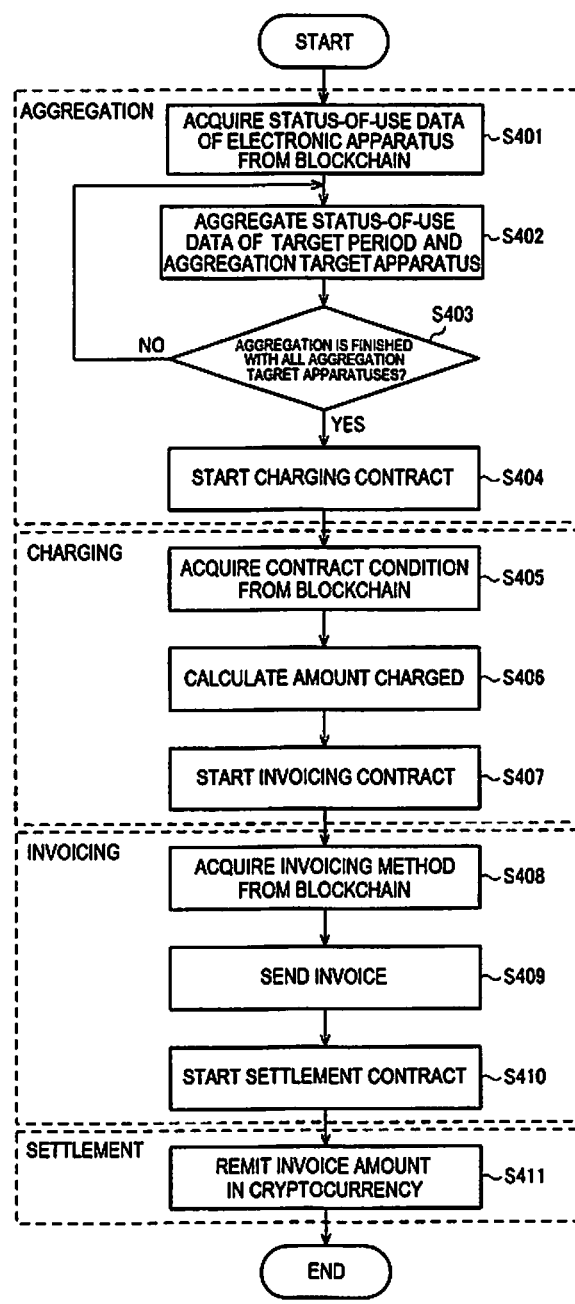
FIG. 8 is a flowchart explaining processing on a cut-off date.

FIG. 8 is a flowchart explaining the processing on the cut-off date executed, triggered by the start processing of the aggregation contract in step S206. In the description below, it is assumed that each program written into the blockchain, based on a smart contract, executes each step in FIG. 8. However, in practice, one of the nodes in the blockchain network NW executes the program in the execution environment within the node and thus implements each step. That is, the processing in FIG. 8 may be executed by the providing device 100 or may be executed by another node such as the processing device 200.

As this processing is started, the aggregation contract acquires status-of-use data from the blockchain (S401) and performs aggregation processing of the status-of-use data (S402). Specifically, the aggregation contract acquires status-of-use data that coincides with the information of the aggregation target period and the aggregation target apparatus provided as a parameter from the contract management contract, of the status-of-use data accumulated in the blockchain. The aggregation contract then performs aggregation processing of the acquired status-of-use data. As described above, the collection contract performs the processing to write, into the blockchain, the collection time information and the information of the electronic apparatus 300 that is a collection target, in association with the status-of-use data. This association enables the aggregation contract to use proper status-of-use data as a target of the aggregation processing.

In the example of FIG. 8, when there is a plurality of electronic apparatuses 300 to be aggregation targets, it is assumed that the aggregation processing is performed with respect to every electronic apparatus 300. Therefore, the processing of step S402 represents the aggregation processing for one of the electronic apparatuses 300 of collection targets. After step S402, the aggregation contract determines whether the aggregation processing is completed for all the electronic apparatuses 300 of collection targets or not (S403). When a target apparatus for which aggregation is not yet done is left (No in step S403), the aggregation contract returns to step S402 and continues the aggregation processing. When the aggregation processing for all the electronic apparatuses 300 is finished, the aggregation contract starts the charging contract, using the contract ID and the result of aggregation as parameters (S404).

The charging contract, thus started, acquires a contract condition from the blockchain (S405). Specifically, the charging contract makes an inquiry to the contract management contract, based on the contract ID acquired as a parameter, and acquires the unit price and discount information as a contract condition. The charging contract then decides the amount charged, based on the contract condition and the result of aggregation acquired as a parameter (S406). After deciding the amount charged, the charging contract starts the invoicing contract, using the contract ID and the amount charged as parameters (S407).

The invoicing contract, thus started, acquires an invoicing method from the blockchain (S408). Specifically, the invoicing contract makes an inquiry to the contract management contract, based on the contract ID acquired as a parameter, and acquires information of a destination and sending method, as the invoicing method. The invoicing contract sends an invoice by the acquired method (S409).

When making a settlement using a cryptocurrency, the invoice in step S409 is a payment request in the blockchain. To make a payment request, the invoicing contract starts the settlement contract for the contracting party that is an invoicing target, using its own cryptocurrency reception address and the invoice amount as parameters (S410).

The settlement contract uses the address of the contracting party held by the settlement contract itself, as the transmission address for the cryptocurrency. The settlement contract then performs processing to write, into the blockchain, transaction data to the effect that the invoice amount is remitted from the transmission address to the reception address acquired as a parameter (S411). The actual cryptocurrency transaction is concluded after a consensus built based on a consensus algorithm is approved.

In the settlement processing, when the account of the contracting party only holds an amount of cryptocurrency less than the invoice amount, the settlement contract may perform processing to write the shortage as an unsettled transaction into the blockchain. In this case, the settlement contract processes transactions in order from the unsettled transaction in the blockchain at the time of the next settlement onward, and thus executes the settlement of the unpaid invoice.

Subsequently, by continuously implementing the execution processing of the contract management contract shown in FIG. 6, the periodic collection processing by the collection contract shown in FIG. 7, and the cut-off date processing shown in FIG. 8, the processing system 10 automatically executing the collection processing, the aggregation processing, the charging processing, the invoicing processing, and the settlement processing can be achieved. Automating the charging processing in the blockchain can achieve automatic charging via only one system. Also, a part of the processing for charging may be executed without using the blockchain, as in the case where a settlement of an invoicing made by mail or by email is made without using a cryptocurrency.

According to the embodiment, processing for charging according to the status of use of the electronic apparatus 300 can be automated, using the blockchain technology. In a narrow sense, each processing of collection of status-of-use data, aggregation of the collected status-of-use data, charging based on the result of aggregation, and invoicing for the amount charged can be automated. Similarly, a settlement based on invoicing can be automated, using a cryptocurrency in the blockchain. In the blockchain technology, consensus building based on a consensus algorithm is carried out when writing data into the blockchain. This can restrain an issued transaction from being left unattended without being written, and can restrain the same transaction from being written twice. That is, duplicate charging and failure to charge can be restrained without a manual check.

3.4 Modification Examples

An example where the contract management contract has a periodic execution function and an example where the contract management contract not having a periodic execution function is started by an external program are described above. In both cases, an example where the contract management program is implemented as a program written into the blockchain, based on a smart contract, is described.

However, the contract management program itself may be an external program. The external program starts another contract such as the collection contract at a required timing.

The processing unit 110 of the providing device 100 may generate a transaction for registering, into the blockchain, the collection program for collecting the status-of-use data of the electronic apparatus 300, and the collection program may be started by the external program. Alternatively, the processing unit 110 may generate a transaction for registering, into the blockchain, the aggregation program for aggregating the status-of-use data, and the aggregation program may be started by the external program. Thus, the contract management program can be implemented in various forms.

As described above, the providing device according to the embodiment includes: a communication unit communicating with a network using a blockchain; and a processing unit controlling the communication unit. The processing unit generates a transaction for registering, into the blockchain, a charging processing program for performing charging processing according to a status of use of an electronic apparatus that is a management target, and issues the generated transaction to the network via the communication unit.

In the embodiment, the processing to register the program for charging according to the status of use of the electronic apparatus, into the blockchain, is carried out. As the charging processing program is written into the blockchain, the charging processing program can be executed at each node in the network using the blockchain. Thus, charging according to the status of use of the electronic apparatus can be properly executed, using the blockchain.

In the embodiment, the processing unit may generate the transaction for registering, into the blockchain, a contract management program for managing contract account information to decide a charging content.

Thus, the management of the contract account information can be executed, using the blockchain.

In the embodiment, the processing unit may generate the transaction for registering, into the blockchain, a collection program for collecting status-of-use data of the electronic apparatus.

Thus, the collection of the status-of-use data can be executed, using the blockchain.

In the embodiment, the processing unit may generate the transaction for registering, into the blockchain, a collection program for collecting status-of-use data of the electronic apparatus. The collection program may be started according to a predetermined schedule by the contract management program.

Thus, the collection of the status-of-use data can be executed, using the blockchain, and the contract management program and the collection program can be made to work in cooperation with each other.

In the embodiment, the processing unit may generate the transaction for registering, into the blockchain, an aggregation program for aggregating the status-of-use data.

Thus, the aggregation of the status-of-use data can be executed, using the blockchain.

In the embodiment, the processing unit may generate the transaction for registering, into the blockchain, an aggregation program for aggregating the status-of-use data. The aggregation program may be started by the contract management program.

Thus, the aggregation of the status-of-use data can be executed, using the blockchain, and the contract management program and the aggregation program can be made to work in cooperation with each other.

In the embodiment, the charging processing program may be started by the aggregation program.

Thus, the contract management program and the charging processing program can be made to work in cooperation with each other.

In the embodiment, the status-of-use data may be amount-of-use information or time-of-use information of the electronic apparatus.

Thus, data suitable for the charging processing can be properly collected as the status-of-use data.

In the embodiment, the processing unit may generate the transaction for registering, into the blockchain, an invoicing program for invoicing a corresponding contract account for an amount charged decided by the charging processing program. The invoicing program may be started by the charging processing program.

Thus, the amount charged can be invoiced, using the blockchain, and the charging processing program and the invoicing program can be made to work in cooperation with each other.

In the embodiment, the processing unit may generate the transaction for registering the charging processing program as a smart contract into the blockchain.

Thus, the charging processing program can be provided as a smart contract in the blockchain technology.

The processing system according to the embodiment includes: the providing device described in one of the foregoing forms; and a processing device that is provided corresponding to the electronic apparatus and that acquires the charging processing program from the blockchain and executes the charging processing program.

Thus, a system that performs charging processing using the blockchain and thus properly executes charging according to the status of use of the electronic apparatus can be implemented.

In the embodiment, the processing device may generate the transaction for registering, into the blockchain, a settlement program for making a settlement of an invoicing based on the invoicing program. The settlement program may make a settlement, using a cryptocurrency in the blockchain.

Thus, the settlement processing of the invoicing can be executed, using the blockchain. In this case, the processing device, which is the invoice receiving side, performs processing to register the settlement program. Thus, cryptocurrency remittance processing can be properly executed.

The communication method according to the embodiment is a communication method in a network using a blockchain. The method includes: generating a transaction for registering, into the blockchain, a charging processing program for performing charging processing according to a status of use of an electronic apparatus that is a management target; and issuing the generated transaction to the network.

The embodiment is described in detail above. However, a person skilled in the art can readily understand that various modifications can be made without substantially departing from the new matters and effects of the present disclosure. Therefore, all such modifications are included in the scope of the present disclosure. For example, a term described along with a different term having a broader meaning or the same meaning, at least once in the specification or drawings, can be replaced with the different term at any point in the specification or drawings. Also, all combinations of the embodiment and modifications are included in the scope of the present disclosure. The configuration and operation of the providing device, the processing device and the like are not limited to those described in the embodiment and can be implemented with various modifications.

What is claimed is:

1. A providing device comprising:
    a communication circuit communicating with a network using a blockchain; and
    a processor controlling the communication unit, wherein
    the processor generates a transaction that includes a charging processing program to be registered into the blockchain, the charging processing program executes charging processing according to a status of use of an electronic apparatus that is a management object, and the processor further generates a transaction that includes collection program to be registered into the blockchain, the collection program executes acquiring status-of-use data of the electronic apparatus,
    the processor issues, to the network via the communication circuit, the transactions that include the charging processing program and the collection program, respectively, and that have been generated,
    the charging processing program executes the charging processing according to the status of use of the electronic apparatus, based on the status-of-use data acquired by the collection program, the collection program causes a processing device, which is coupled to the electronic apparatus, to execute acquiring the status-of-use data via communication with the electronic apparatus, and the processing device is a device different from the electronic apparatus.

2. The providing device according to claim 1, wherein the processor generates a transaction that includes a contract management program to be registered into the blockchain, and the contract management program executes managing of contract account information to decide a charging content.

3. The providing device according to claim 2, wherein the collection program is started according to a predetermined schedule by the contract management program.

4. The providing device according to claim 3, wherein the processor generates a transaction that includes an aggregation program to be registered into the blockchain, the aggregation program executes aggregating of the status-of-use data, and the aggregation program is started by the contract management program.

5. The providing device according to claim 1, wherein the processor generates a transaction that includes an aggregation program to be registered into the blockchain, and the aggregation program executes aggregating of the status-of-use data.

6. The providing device according to claim 5, wherein the charging processing program is started by the aggregation program.

7. The providing device according to claim 1, wherein the status-of-use data is amount-of-use information or time-of-use information of the electronic apparatus.

8. The providing device according to claim 1, wherein the processor generates a transaction that includes an invoicing program to be registered into the blockchain, the invoicing program executes invoicing of a corresponding contract account for an amount charged and decided by the charging processing program, and the invoicing program is started by the charging processing program.

9. The providing device according to claim 1, wherein the processor generates the transaction that includes the charging processing program as a smart contract.

10. A processing system comprising:

a providing device including a communication circuit that communicates with a network using a blockchain, and a processor that controls the communication circuit, wherein the processor generates a transaction that includes a charging processing program to be registered into the blockchain, the charging processing program executes charging processing according to a status of use of an electronic apparatus that is a management object, and the processor further generates a transaction that includes collection program to be registered into the blockchain, the collection program executes acquiring status-of-use data of the electronic apparatus, the processor issues, to the network via the communication circuit, the transactions that include the charging processing program and the collection program, respectively, and that have been generated, the charging processing program executes the charging processing according to the status of use of the electronic apparatus, based on the status-of-use data acquired by the collection program, the processing system further comprises a processing device coupled to the electronic apparatus, acquiring and executing the charging processing program registered in the blockchain, and thus performing the charging processing according to the status of use of the electronic apparatus based on the status-of-use data, the collection program causes the processing device to execute acquiring the status-of-use data via communication with the electronic apparatus, and the processing device is a device different from the electronic apparatus.

11. A communication method in a network using a blockchain, the method comprising:

generating a transaction that includes a charging processing program to be registered into the blockchain, the charging processing program executing charging processing according to a status of use of an electronic apparatus that is a management object;

generating a transaction that includes collection program to be registered into the blockchain, the collection program executing acquiring of status-of-use data of the electronic apparatus;

issuing, to the network, the transactions that include the charging processing program and the collection program, respectively, and that have been generated, causing, by the collection program, a processing device, which is coupled to the electronic apparatus, to execute acquiring the status-of-use data via communication with the electronic apparatus, the processing device being a device different from the electronic apparatus; and executing the charging processing according to the status of use of the electronic apparatus, based on the status-of-use data acquired by the collection program.

12. The providing device according to claim 1, wherein the collection program causes the processing device to execute acquiring the status-of-use data from the electronic apparatus via the communication in conformity with Simple Network Management Protocol.

* * * * *